(12) United States Patent
Kwok et al.

(10) Patent No.: US 7,969,543 B2
(45) Date of Patent: Jun. 28, 2011

(54) RETARDATION FILMS HAVING SINGLE RETARDATION VALUE WITH VARIATION

(75) Inventors: Hoi-Sing Kwok, Hong Kong (CN); Xing-Jie Yu, Hong Kong (CN)

(73) Assignee: The Hong Kong University of Science and Technology, Hong Kong, SAR (CN)

( * ) Notice: Subject to any disclaimer, the term of this patent is extended or adjusted under 35 U.S.C. 154(b) by 312 days.

(21) Appl. No.: 11/652,925

(22) Filed: Jan. 11, 2007

(65) Prior Publication Data
US 2007/0159582 A1 Jul. 12, 2007

Related U.S. Application Data

(60) Provisional application No. 60/758,116, filed on Jan. 12, 2006.

(51) Int. Cl.
*G02F 1/1335* (2006.01)
(52) U.S. Cl. ........ 349/119; 349/117; 349/118; 349/120; 349/121
(58) Field of Classification Search .......... 349/18, 349/117–121, 95, 98, 99, 103, 104, 105; 356/364–365; 359/494, 497, 499
See application file for complete search history.

(56) References Cited

U.S. PATENT DOCUMENTS

| | | | | |
|---|---|---|---|---|
| 6,042,236 A * | 3/2000 | Hatakeyama et al. | .......... | 353/31 |
| 6,519,016 B1 * | 2/2003 | Ichihashi et al. | .............. | 349/117 |
| 6,565,974 B1 * | 5/2003 | Uchiyama et al. | ............ | 428/412 |
| 6,795,246 B2 * | 9/2004 | Yano et al. | .................... | 359/500 |
| 6,961,181 B2 * | 11/2005 | Chen et al. | .................... | 359/498 |
| 2002/0015314 A1 * | 2/2002 | Umemoto et al. | ............ | 362/561 |
| 2003/0147015 A1 * | 8/2003 | Katoh et al. | ....................... | 349/5 |
| 2007/0127130 A1 * | 6/2007 | Ushino et al. | ................. | 359/625 |
| 2008/0310285 A1 * | 12/2008 | Oto | .......................... | 369/112.16 |

OTHER PUBLICATIONS

Yip, W.C. et al.; *Efficient Polarization Converter for Projection Displays*; Applied Optics vol. 36, No. 25 (1997) 6453-6457.
Pancharatnam, S.; *Achromatic Combinations of Birefringent Plates*; Part I. An Achormatic Circular Polarizer; Memoir No. 71 of the Raman Research Institute, Bangalore (1955) 130-136.
Ishinabe, T. et al.; *LP-6 Design of a Quarter Wave Plate with Wide Viewing Angle and Wide Wavelength Range for High Quality Reflective LCDs*; SID 01 DIGEST (2001) 906-909.
Yu, X.J. et al.; *Design of Polarization Interference Filters*; Displays; 23 (2002) 145-149.
Ammann, E.O.; *Optical Network Synthesis Using Birefringent Crystals. III. Some General Properties of Lossless Birefringent Networks*; Journal of the Optical Society of America; vol. 56, No. 7 (1966) 943-951.

* cited by examiner

*Primary Examiner* — Hoan C Nguyen
(74) *Attorney, Agent, or Firm* — Robert D. Katz; Cooper & Dunham LLP

(57) ABSTRACT

This invention pertains to the design and construction of retardation films (or plates) with any targeted dispersive property, including those with no wavelength dependence for the entire visible range. In particular, this invention deals with specific design of films with broadband (achromatic) quarter-wave and halfwave retardation.

5 Claims, 7 Drawing Sheets

HWP (HWP+HWP+HWP)

HWP (HWP+HWP)

QWP (HWP+QWP)

QWP (HWP+HWP+QWP)

RETARDATION FILMS HAVING SINGLE RETARDATION VALUE WITH VARIATION

CROSS-REFERENCE TO RELATED APPLICATION

This application claims the benefit of U.S. Provisional Patent Application Ser. No. 60/758,116, filed on Jan. 12, 2006, the entire contents of which are incorporated herein by reference.

FIELD OF THE INVENTION

This invention pertains to the design and construction of retardation films (or plates) with any targeted dispersive property, including those with no wavelength dependence for the entire visible range. In particular, this invention deals with specific design of films with broadband (achromatic) quarterwave and halfwave retardation.

BACKGROUND OF THE INVENTION

Retardation films, also called retardation plates, are used widely in optical systems. They can either be biaxial where $n_{x'} \neq n_{y'} \neq n_{z'}$, or uniaxial where $n_{z'}$ is equal to either $n_{x'}$ or $n_{y'}$. Here we define the direction of wave propagation to be the z-axis. The various symbols $n_{x'}$, $n_{y'}$ and $n_{z'}$ stand for the refractive indices of the material in the various principle directions. Here we define the principle axes of the film as (x', y', z') and the laboratory axes as (x, y, z). Since the films are going to be rotated about the z'-axis, we can let the films principal z-axis and the laboratory z-axis to be identical.

In both uniaxial and biaxial films, the optical retardation for waves polarized in one principal direction, such as the x'-axis, is different from the optical retardation for waves polarized in the orthogonal direction, such as the y'-axis, resulting in modification of the polarization state of any input wave. To be specific, the retardation value of a retardation plate mentioned in this invention is defined as the phase difference between the two orthogonal polarizations and is given by $$\Gamma = \frac{2\pi d \Delta n}{\lambda} \quad (1)$$

where d is the thickness and $\Delta n = n_{y'} - n_{x'}$ is the birefringence of the retardation film, and $\lambda$ is the wavelength of the input light. If $\Gamma = \pi$, then the retardation plate is a halfwave plate (HWP). If $\Gamma = \pi/2$, it is a quarterwave plate (QWP). Note that the value of $n_{z'}$ is not a factor for the retardation plates discussed here, since we assume the wave to be propagating in the z-direction. However, $n_{z'}$ will affect the viewing angle properties of the retardation film. It will have to be considered when both the dispersion and viewing angle have to be optimized.

Retardation films or plates have many applications such as in polarization manipulation and in phase compensation. Of all the retardation films, the halfwave plate and quarterwave plate are the most often used. In display engineering, they are used, for example, in viewing angle enhancement and for dispersion compensation [1]. In projection systems, QWP and HWP are used in polarization conversion optics and in skew ray compensation [2,3]. In all applications, the HWP and QWP should work well over the whole visible spectrum (400~700 nm). However, conventional HWP and QWP using uniaxial or biaxial retardation films have strong wavelength dependence. As well, their angular dependences are not totally desirable, namely, the retardation changes as the beam propagation direction changes.

Various methods have been proposed to extend the wavelength range of retardation films [4, 5]. Several systems have been proposed making use of new materials (Zhu and Wu, U.S. Pat. No. 6,922,221: Broadband Quarter-Wave Film Device Including in Combination a Chromatic Half-Wave Film and a TN-LC Polymeric Film; Verrall, Ward, Hanmer, and Coates, U.S. Pat. No. 6,544,605: Combination of Optical Elements).

In this invention, we provide a new broadband film design and method of making such films, making use of commercially available wavelength dispersive films. The present invention combines such films to make broadband (achromatic) retardation films. By making and using films according to the present invention, we can provide very broad broadband QWP and HWP films using commercial uniaxial or biaxial retardation films. Very importantly, these QWP and HWP films show negligible wavelength dependence, even at large viewing angles. In addition, the present invention can also be extended to cover retardation films with any targeted dispersion properties. For example, it can have a dispersion that matches that of the birefringence $\Delta n_{LC}$ of the liquid crystal material. Thus, full compensation can be achieved for all wavelengths.

SUMMARY OF THE INVENTION

In this invention, the design of the retardation film such as HWP and QWP is treated as similar to the design of polarization interference filters (PIF) [5]. PIF is a filter that rotates the polarization of a particular wavelength band by 90°, while leaving all the other complementary wavelengths unchanged. This task is accomplished by a stack of retardation films as shown in FIG. 2. A PIF, together with an output polarizer, will therefore transmit a particular band of wavelengths. A PIF is different from a conventional interference filter in that the two complementary spectra can be separated by a polarizing beam splitter [3, 6]. An HWP rotates the polarization of incoming light by 90° if the x'-axis or y'-axis of the waveplate makes an angle of 45° with the incoming polarization. Thus, a broadband HWP can be regarded as equivalent to PIF with a very broad spectrum covering the entire visible range. Similarly, a QWP can be regarded as a special PIF which upon reflection rotates the polarization of the entire visible spectrum by 90°. FIG. 1 is a schematic diagram illustrating the principle of QWP and HWP.

The basic structure of a PIF is shown in FIG. 3. It includes a number of birefringent films placed between two polarizers. In the design of a PIF, the variables are the individual angles $\Phi_i$, as well as the retardation value $\Gamma$ of the films. In most cases, we use only films with the same retardation value in order to simplify the manufacturing process. We shall also extend this to a combination of retardation films with retardation values that are multiple of each other, for example, $\Gamma$ and $2\Gamma$. This is not a severe constraint on PIF design. In our view, more design freedom can be afforded with a combination of retardation values.

The transfer function $C(\omega)$ of an N component PIF system is given by [6]

$$C(\omega) = C_0 + C_1 e^{-i\tau_d \omega} + C_2 e^{-i2\tau_d \omega} \ldots + C_N e^{-iN\tau_d \omega} \quad (2)$$

where $$\tau_d = \frac{d\Delta n}{c},$$

$\Delta n$ is the dispersive birefringence of the retardation plate, d is the film thickness, and c is the velocity of the light in a vacuum. Since $$\omega = \frac{2\pi c}{\lambda},$$

thus $$\omega \tau_d = \frac{2\pi \Delta n d}{\lambda} = \Gamma. \quad (3)$$

Eq. (2) can therefore be rewritten as, $$C(\Gamma) = C_0 + C_1 e^{-i\Gamma} + C_2 e^{-i2\Gamma} \ldots + C_N e^{-iN\Gamma}. \quad (4)$$

It is well known that the Jones matrix can describe exactly the polarization state of light for normal incidence. Without loss of generality, we can define the x-axis as the direction of the input polarizer. Then the Jones vector of the input light is $$E_{in} = \begin{bmatrix} 1 \\ 0 \end{bmatrix}. \quad (5)$$

The Jones matrix of the $i^{th}$ retardation plate is given by, $$W_i = R(-\phi_i) W_0 R(\phi_i) \quad (6)$$

$$= e^{-i\psi} \begin{bmatrix} \cos\phi_i & -\sin\phi_i \\ \sin\phi_i & \cos\phi_i \end{bmatrix} \begin{bmatrix} e^{-i\Gamma} & 0 \\ 0 & 1 \end{bmatrix} \begin{bmatrix} \cos\phi_i & \sin\phi_i \\ -\sin\phi_i & \cos\phi_i \end{bmatrix}$$

where $\phi_i$ is the optical axis orientation of the $i^{th}$ retardation plate relative to the x-axis, $R(\phi)$ is the polarization rotation matrix and $$\psi = \pi(n_e + n_o) \frac{d}{\lambda}.$$

The optical axis of the retardation plate is defined as the x'-axis. The constant phase factor $\psi$ in eq. (6) can be ignored in general without affecting the results since it does not affect the polarization state. The Jones matrix of the combination of N waveplates is therefore given by, $$W = \prod_{i=1}^{N} W_i. \quad (7)$$

If we now rotate the PIF so that the new x-axis is in the direction of the output analyzer axis, the new output Jones vector will be given by, $$E_{out} = \begin{bmatrix} E_u \\ E_v \end{bmatrix} = \begin{bmatrix} \cos\phi_P & \sin\phi_P \\ -\sin\phi_P & \cos\phi_P \end{bmatrix} \prod_{i=1}^{N} W_i \begin{bmatrix} 1 \\ 0 \end{bmatrix}, \quad (8)$$

where $\phi_p$ is the angle of the output analyzer relative to the original x-axis. Thus $E_u$ is the real output in frequency domain, and $E_v$ is the complementary function of $E_u$. It is easy to see that eq. (8) can be rewritten as $$E_{out} = \begin{bmatrix} \cos\theta_p e^{-i\Gamma} & \sin\theta_p \\ -\sin\theta_p e^{-i\Gamma} & \cos\theta_p \end{bmatrix} \prod_{i=2}^{N} \begin{bmatrix} \cos\theta_i e^{-i\Gamma} & \sin\theta_i \\ -\sin\theta_i e^{-i\Gamma} & \cos\theta_i \end{bmatrix} \begin{bmatrix} \cos\theta_1 \\ -\sin\theta_1 \end{bmatrix}, \quad (9)$$

where $$\begin{aligned} \theta_1 &= \phi_1 \\ \theta_2 &= \phi_2 - \phi_1 \\ &\vdots \\ \theta_N &= \phi_N - \phi_{N-1} \\ \theta_P &= \phi_P - \phi_N \end{aligned} \quad (10)$$

Eq. (9) can be expanded to give $$E_u(\Gamma) = E_0 + E_1 e^{-i\Gamma} + E_2 e^{-i2\Gamma} \ldots + E_N e^{-iN\Gamma}, \quad (11)$$

where the coefficients $E_i$ on the right-hand-side are functions of relative angle $\theta_i$ of the birefringent films and polarizers. Note that the actual output $E_u(\Gamma)$ given in eq. (11) and the desired output $C(\Gamma)$ in eq. (4) have the same format. Designing a PIF based on Jones matrix involves finding the values of $\phi_i$ such that $$E_u(\Gamma) = C(\Gamma) \quad (12)$$

In the numerical procedure, the desired output $C(\Gamma)$ is given first, thus the coefficients $C_i$ in eq. (4) can be calculated. Comparing the coefficients in eq. (11) and eq. (4), the relative angle $\phi_i$ of each birefringent film can therefore be obtained. The target output can be a broadband QWP or HWP. In addition, it can be a QWP or HWP with any targeted spectral dispersion properties. It can have a retardation dispersion that matches that of a liquid crystal for instance.

Let us also comment on the behavior of the dispersion of $\Delta n$. While the expansion in eq. (11) is always correct, straightly speaking, the expansion in eq. (2) is only valid if $\tau_d$ is a constant. Here we assume the wavelength dependence of $\tau_d$ to be very small so that it does not have to be included in the harmonic expansion. However, as can be seen in the specific examples of retardation film designs, this restriction is rather mild and does not affect the optical properties of the invented retardation films. Thus based on the algorithm given above, we have a new method for the design of any broadband retardation films using just conventional films.

BRIEF DESCRIPTION OF THE DRAWINGS

Further features and advantages of the invention may be understood by reference to the following detailed description of the preferred embodiments, taken in conjunction with the following drawings, in which.

DETAILED DESCRIPTION OF THE PREFERRED EMBODIMENTS

Figure 1:
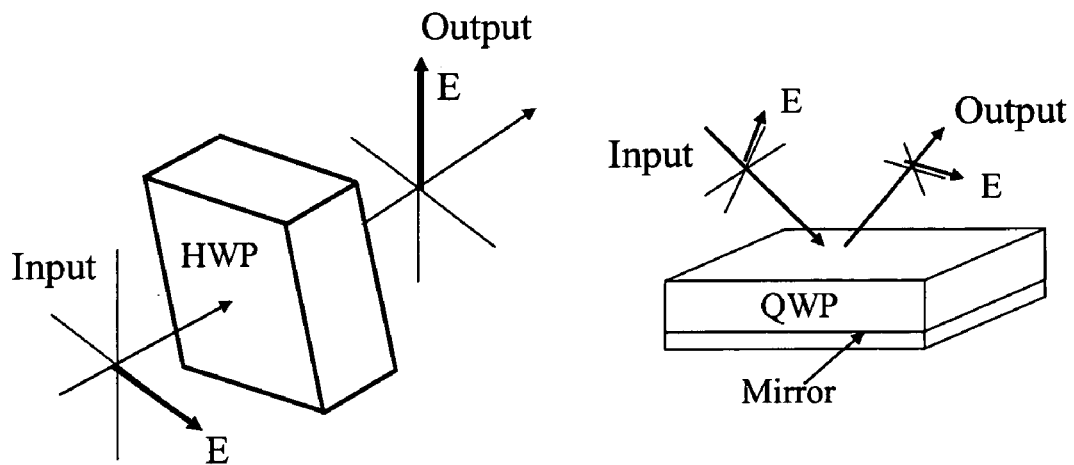
FIG. 1 is a schematic diagram illustrating the principle of QWP and HWP.
Figure 2:
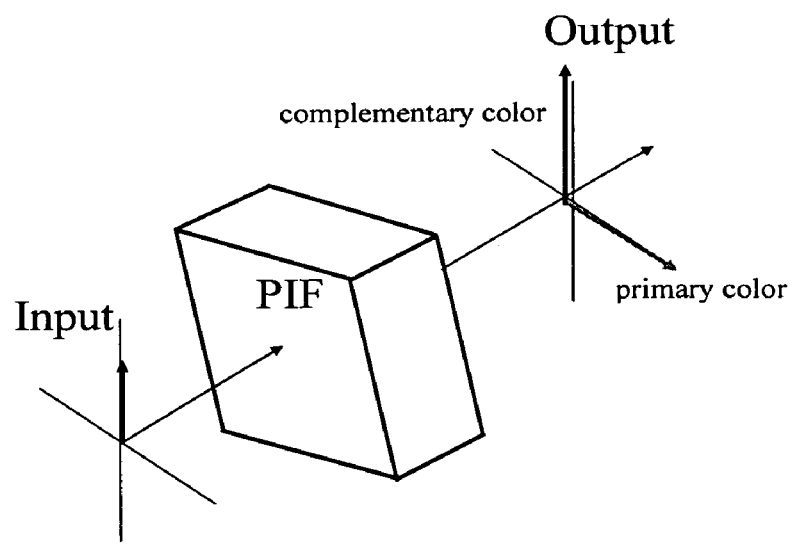
FIG. 2 is a schematic diagram illustrating the principle of PIF type retardation plate.
Figure 3:
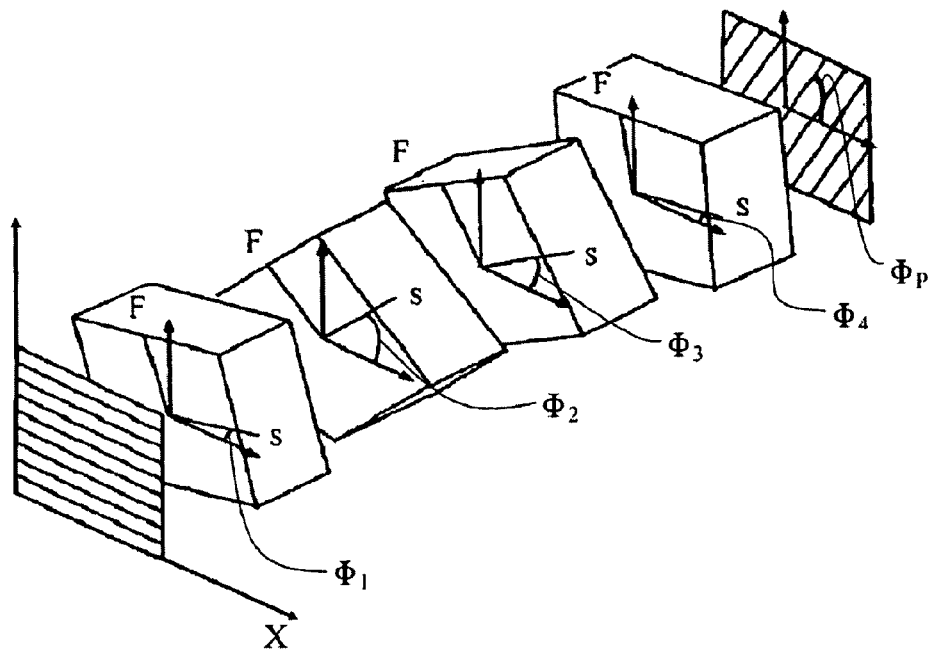
FIG. 3 is a schematic diagram illustrating the basic structure of PIF.

In the preferred embodiments of the present invention, a number of retardation films with known retardation are stacked together to act as a single plate. The precise angles at which these films are stacked, inter alia helps to provide some of the important features and advantages of the present invention.

Broadband HWP

We describe two preferred embodiments of the present invention that deal with broadband halfwave retardation films (HWP). The broadband HWP works in the transmissive mode, and rotates the input linearly polarized light by 90° for the whole visible spectrum. Thus a HWP PIF between two crossed polarizers should have 100% efficiency. The desired transmission is given by $$T(\Gamma) = |C(\Gamma)|^2 = C(\Gamma) \cdot C^*(\Gamma) = 100\% (400 \sim 700 \text{ nm}). \quad (13)$$

Because the constraint condition (13) is rather loose, there are multi-solutions to C (Γ). This is different from PIF color filters where there are more constraints [6, 7].

Using this approach, the following design rules can be used in fabricating a broadband HWP:

1. Two Layer Design (HWP+HWP)

In the first preferred embodiment of this invention, we use two standard dispersive HWPs to make a broadband HWP. The design rules are:

$$\phi_1 = 15^\circ \sim 30^\circ \quad (14)$$

$$\phi_2 = \phi_1 + 45^\circ \pm \Delta\phi, \quad (15)$$

where $\Delta\phi$ is in the range of ±5°. Here $\phi_2$ and $\phi_1$ are the orientation angles of the $2^{nd}$ and $1^{st}$ HWP relative to the x-axis as defined above. Notice that the values of $\phi_i$ are defined to modulus 180°, since rotating the retardation films by multiples of 180° in either the clockwise or counterclockwise directions does not change anything physically. For example, a retardation film at an angle of −35° is the same as one at an angle of 145°.

It should be noted that if $\phi_1, \phi_2, \phi_3 \ldots \phi_N, \phi_P$ are the solutions, then $-\phi_1, -\phi_2, -\phi_3 \ldots -\phi_N, -\phi_P; \phi_P, \phi_N, \phi_{N-1} \ldots \phi_2, \phi_1; -\phi_P, -\phi_N, -\phi_{N-1} \ldots -\phi_2, -\phi_1$ are also solutions.

EXAMPLE ONE

Broadband HWP with Two Conventional Uniaxial HWPs

Figure 5:
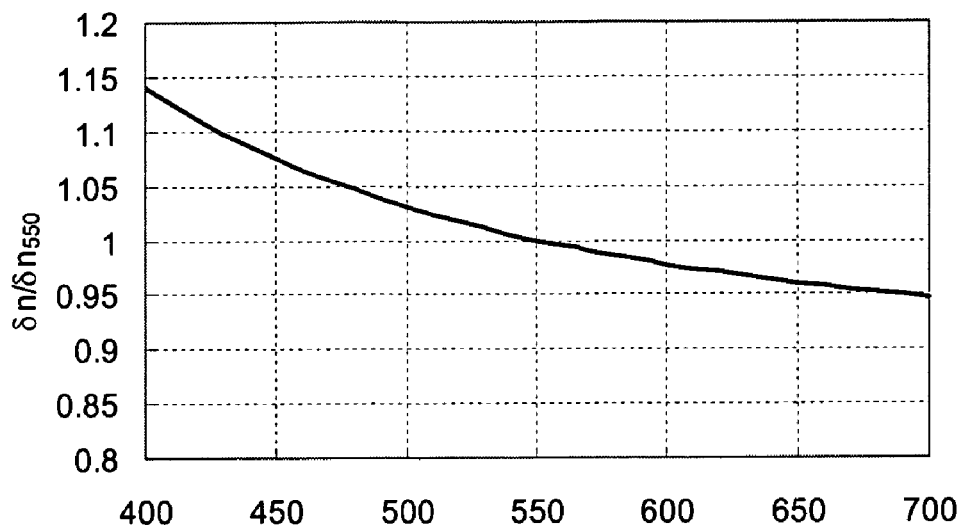
FIG. 5 is a schematic diagram illustrating the normalized dispersion property of the commercial film used in the present invention.

For a specific design of the broadband HWP, a commercial uniaxial HWP retardation film with a retardation value Γ of π at 540 nm can be used. The film is a Nitto-Denko NRF film (Nitto-Denko Corporation, Ibaraki, Osaka, Japan). The normalized dispersion property of the film is given by Cauchy's equation:

$$\Delta nd = 270 \left( A_0 + \frac{B_0}{\lambda^2} + \frac{C_0}{\lambda^4} \right), \quad (16)$$

where $A_0 = 0.8646$, $B_0 = 3.7018 \times 10^4 (\text{nm}^2)$, $C_0 = 1.2 \times 10^9 (\text{nm}^4)$. The dispersion of Γ is shown in FIG. 5.

Figure 8A:
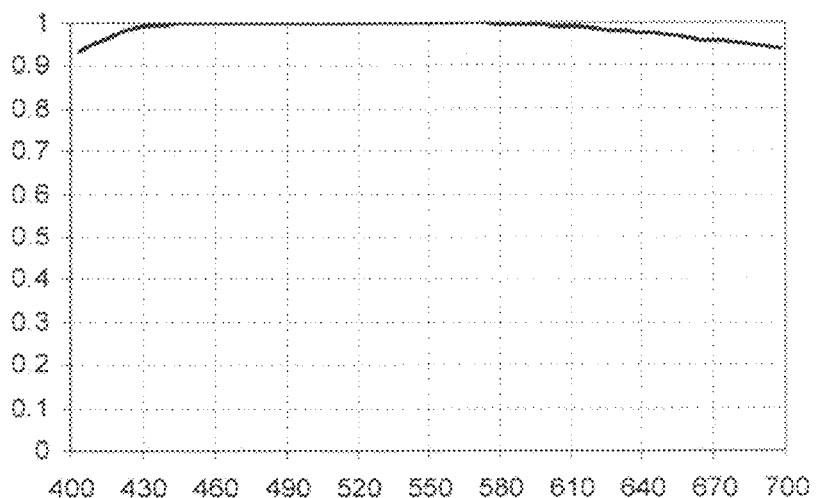
FIGS. 8A and 8B set forth a measured transmission of the 2-layer broadband HWP between two crossed polarizers.
Figure 8B:
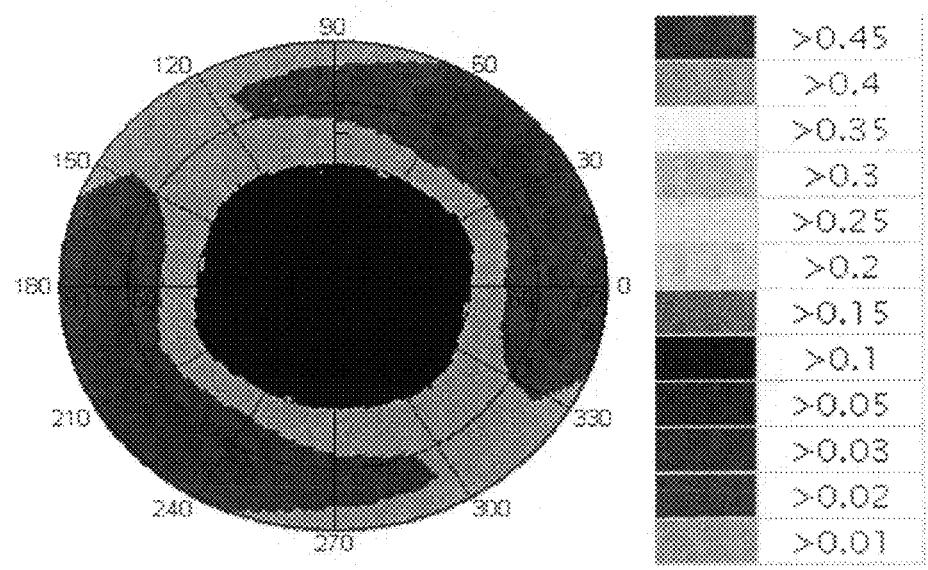

A 2-layer broadband HWP can be designed using equations (14) and (15). Here the specific orientation angles $\phi_1$ and $\phi_2$ are 20° and 64° respectively. FIG. 8 shows the experimental transmission of this two-layer broadband HWP between two crossed polarizers.

2. Three Layer Design (HWP+HWP+HWP)

In the second preferred embodiment of the present invention, we use three conventional dispersive HWPs to make a broadband HWP. The design rules are:

$$\phi_1 = 0^\circ \sim 25^\circ \quad (17)$$

$$\phi_3 = 65^\circ \sim 90^\circ. \quad (18)$$

$$\phi_2 = \phi_1 + \phi_3 \pm 45^\circ \pm \Delta\phi \quad (19)$$

Alternatively, it is also possible to have the design rules $$\phi_1 = 10^\circ \sim 20^\circ \quad (20)$$

$$\phi_3 = 10^\circ \sim 20^\circ \quad (21)$$

$$\phi_2 = \phi_1 + \phi_3 \pm 45^\circ \pm \Delta\phi. \quad (22)$$

Yet another general design rule for the 3-film HWP is $$\phi_1 = 70^\circ \sim 80^\circ \quad (23)$$

$$\phi_3 = 70^\circ \sim 80^\circ \quad (24)$$

$$\phi_2 = \phi_1 + \phi_3 \pm 45^\circ \pm \Delta\phi \quad (25)$$

It should be noted that if $\phi_1, \phi_2, \phi_3 \ldots \phi_N, \phi_P$ are the solutions, then $-\phi_1, -\phi_2, -\phi_3 \ldots -\phi_N, -\phi_P; \phi_P, \phi_N, \phi_{N-1} \ldots \phi_2, \phi_1;$ $-\phi_P, -\phi_N, -\phi_{N-1} \ldots -\phi_2, -\phi_1$ are also solutions.

EXAMPLE TWO

Broadband HWP with Three Conventional HWPs

For a broadband HWP design with three conventional HWPs, we used the same film as described in the above example, with the dispersion given by equation (16). There are four terms in eq. (3). The coefficients $C_i$ are then varied to obtain condition (12). Since there are only 4 variables, convergence is calculated relatively easily. The result is given by $$C(\Gamma) = 0.7275 - 0.4410 e^{-i\Gamma} - 0.2271 e^{-i2\Gamma} - 0.0593 e^{i3\Gamma} \quad (26)$$

Using these coefficients, the relation angles $\phi_i$ for the lamination of the retardation films can readily be obtained.

Figure 6:
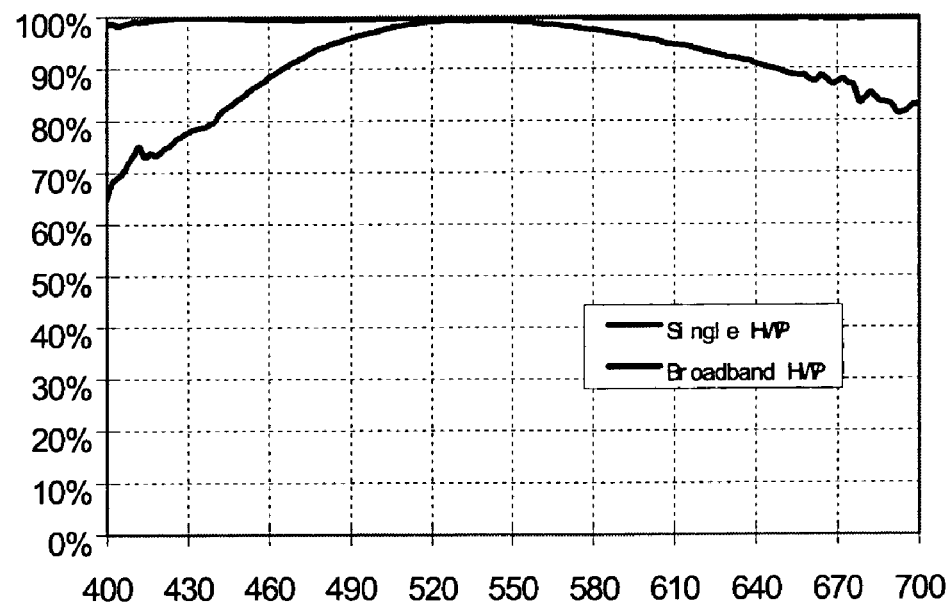
FIG. 6 is a schematic diagram illustrating the measured transmission of the 3-layer broadband HWP between two crossed polarizers.

A HWP using the above design was fabricated by laminating three commercial films together (Quarter Wave or Half Wave Retardation Films, Model Nos. NRFO1A (Code No. R140) and NRFO1A (Code No. R270), respectively, available from Nitto Denko Company, Tokyo, Japan). The specific values of $\phi_1$, $\phi_2$, $\phi_3$ are given in Table 1. We laminated the plates using a GMP Co. Ltd. Desktop Pouch Laminator (Model Supernex 325OLSI) at room temperature and preset pressure. The measured transmission of this three-layer HWP between two crossed polarizers is shown in FIG. 6. The transmission data for a single commercial film is also shown in the same figure. It can be seen that the three-layer film has no discernable change in transmission over the entire visible spectrum. This implies that the retardation is indeed π over the whole range and eq. (13) is obeyed.

Figure 7A:
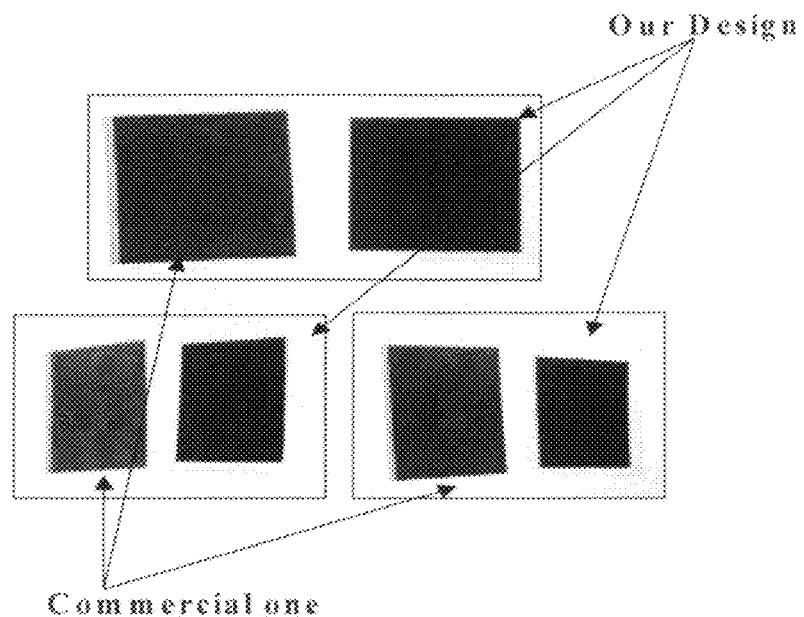
FIGS. 7A and 7B set forth comparisons between the broadband HWP of the present invention and commercially available HWP.
Figure 7B:
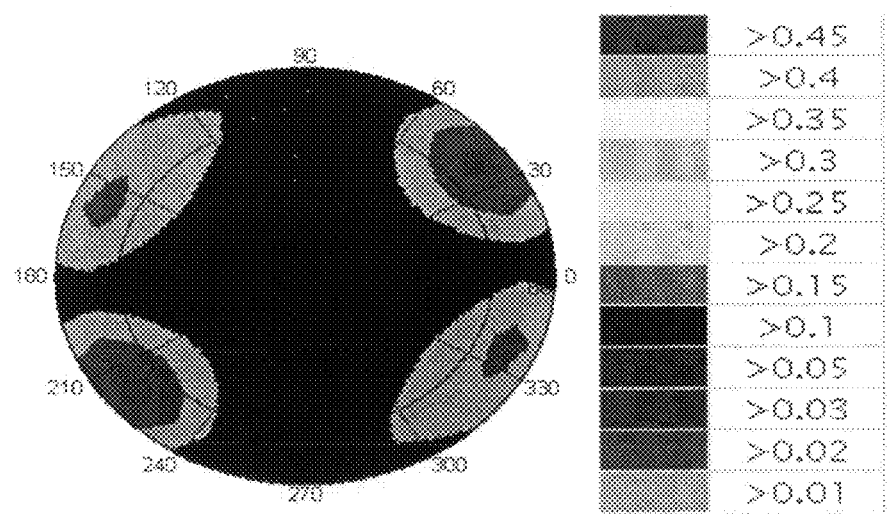

It turns out that the angular dependence of the retardation of the new HWP is also very good. FIG. 7 shows the comparisons between our broadband HWP and the commercial HWP placed between two crossed polarizers at the different viewing angles. It can be seen that our HWP works very well at the whole visible spectrum even for larger viewing angles. The three-layer HWP has better viewing angle properties than the single layer HWP. Since there are three retardation films with varying angles, angular dependence tends to average out in the three-layer design. Actually the three-layer film behaves somewhat as a biaxial film.

Broadband QWP

Figure 4:
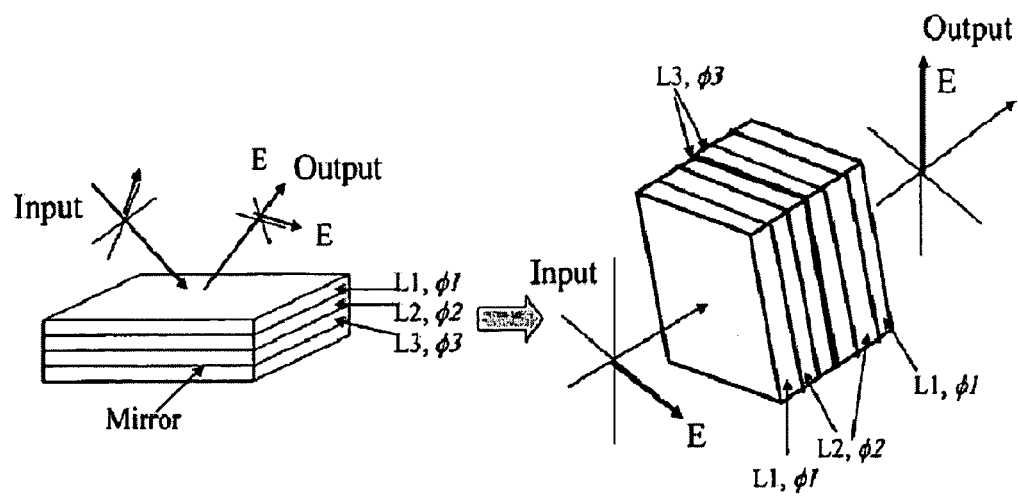
FIG. 4 is a schematic diagram illustrating the reflective PIF system and its equivalent transmissive PIF system.

The third, fourth and fifth preferred embodiments of the present invention are directed to a broadband quarterwave retardation films. A broadband QWP changes the linearly polarized input light into circular polarization. In this case, we cannot simply repeat the formulation of eq. (7-10). However, we can allow the QWP to work in the reflective mode; it will rotate the linearly polarized light by 90°. This reflective PIF system can be equivalent to the transmissive PIF with a symmetric configuration, as shown in FIG. 4. In this system $$\theta_1 = -\theta_p \pm 90°, \theta_2 = -\theta_N, \theta_3 = -\theta_{N-1}, \ldots$$

Due to the symmetric configuration, the $C_i$ in eq. (3) should satisfy the relations [5], $$C_0 = -C_N, C_1 = -C_{N-1}, C_2 = -C_{N-2}, \ldots \quad (27)$$

We still take the 0~π highpass filter as the example. In order to achieve the broadband properties, three layers are needed. So the desired output is given as $$C(\Gamma) = 0.0208 + 0.1191 e^{-i\Gamma} + 0.5983 e^{-i2\Gamma} - 0.5983 e^{-i3\Gamma} - 0.1191 e^{-i4\Gamma} - 0.0208 e^{-i5\Gamma} \quad (28)$$

By comparing the desired outputs in Eqs. (27) and (28) with the real output in Eq. (11), the full solutions can be obtained.

The following design rules can be used to the fabrication of the broadband QWP.

3. Two Layer Design (HWP+QWP)

In the third preferred embodiment of the present invention, we used a conventional dispersive HWP and a QWP to make a broadband QWP. The design rules are:

$$\phi_1 = 5° \sim 25° \quad (29)$$

$$\phi_2 = 2\phi_1 + 45° \pm \Delta\phi \quad (30)$$

where $\Delta\phi$ is ±5° as before.
Alternatively, the design rules are:

$$\phi_1 = 20° \sim 30° \quad (31)$$

$$\phi_2 = 2\phi_1 + 45° \pm \Delta\phi \quad (32)$$

Yet another set of design rules are:

$$\phi_1 = 65° \sim 85° \quad (33)$$

$$\phi_2 = 2\phi_1 + 45° \pm \Delta\phi \quad (34)$$

Again $\phi_2$ and $\phi_1$ are the orientation angles of the $2^{nd}$ QWP and $1^{st}$ HWP respectively, and that the angles $\phi$ and $\phi+N\pi$ are all equivalent for positive and negative integer values of N.

It should be noted that if $\phi_1, \phi_2, \phi_3 \ldots \phi_N, \phi_p$ are the solutions, then $-\phi_1, -\phi_2, -\phi_3 \ldots -\phi_N, \phi_p$ are also solutions. But the reversed order is not a solution.

EXAMPLE THREE

Broadband QWP Using One Conventional HWP and One QWP

To demonstrate this design, we use commercial HWP and QWP retardation films to make the broadband QWP. The film is a Nitto-Denko NRF film, see above. The retardation values of the conventional dispersive films are 270 nm and 140 nm at the wavelength of 540 nm, respectively:

$$\Delta nd = 270\left(A_0 + \frac{B_0}{\lambda^2} + \frac{C_0}{\lambda^4}\right) \quad (35)$$

$$\Delta nd = 140\left(A_0 + \frac{B_0}{\lambda^2} + \frac{C_0}{\lambda^4}\right)$$

where $A_0 = 0.8646$, $B_0 = 3.7018 \times 10^4 (nm^2)$, $C_0 = 1.2 \times 10^9 (nm^4)$. The specific angles of this design are listed in Table 1.

4. Three Layer Design (HWP+HWP+QWP)

In the fourth preferred embodiment of the present invention, three conventional dispersive films (2 HWP and a QWP) are used to fabricate a broadband QWP over the entire visible range. The design rules are:

$$\phi_1 = 0° \sim 20° \quad (35)$$

$$\phi_2 = 10° \sim 60° \quad (36)$$

$$\phi_3 = 2\phi_2 - 2\phi_1 \pm 45° \pm \Delta\phi. \quad (37)$$

Another set of design rules are:

$$\phi_1 = 70° \sim 90° \quad (38)$$

$$\phi_2 = 30° \sim 80° \quad (39)$$

$$\phi_3 = 2\phi_2 - 2\phi_1 \pm 45° \pm \Delta\phi. \quad (40)$$

It should be noted that if $\phi_1, \phi_2, \phi_3 \ldots \phi_N, \phi_p$ are the solutions, then $-\phi_1, -\phi_2, -\phi_3 \ldots -\phi_N, -\phi_p$ are also solutions. But the reversed order is not a solution.

EXAMPLE FOUR

Broadband QWP with Two Conventional HWP and One QWP

Figure 9A:
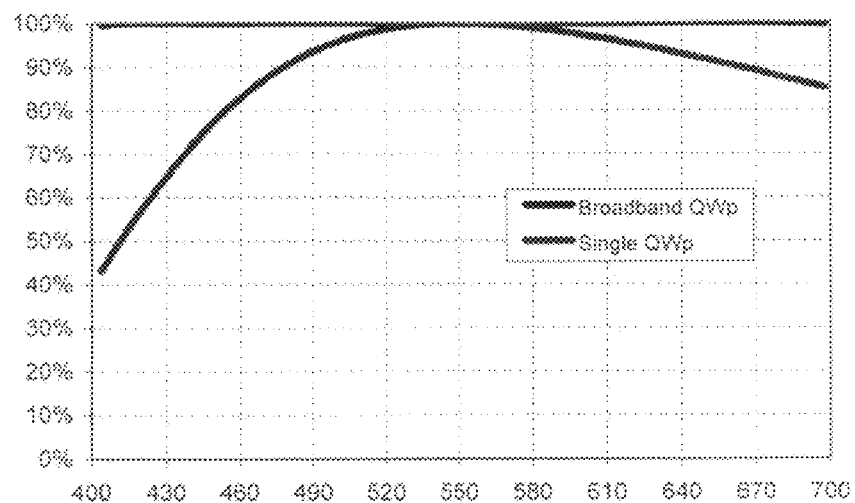
FIGS. 9A-C is a comparison between a commercially available QWP and broadband QWP of the present invention.
Figure 9B:
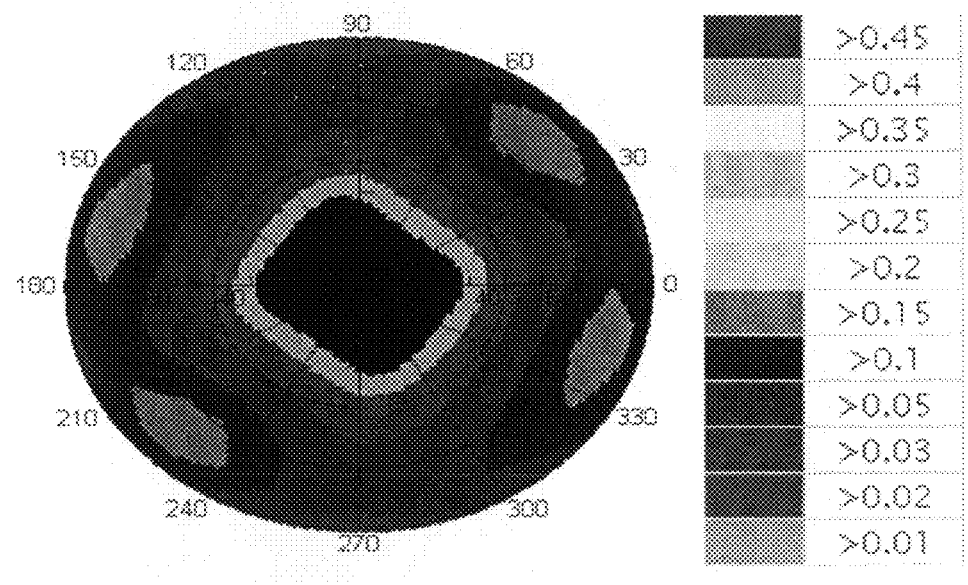
Figure 9C:
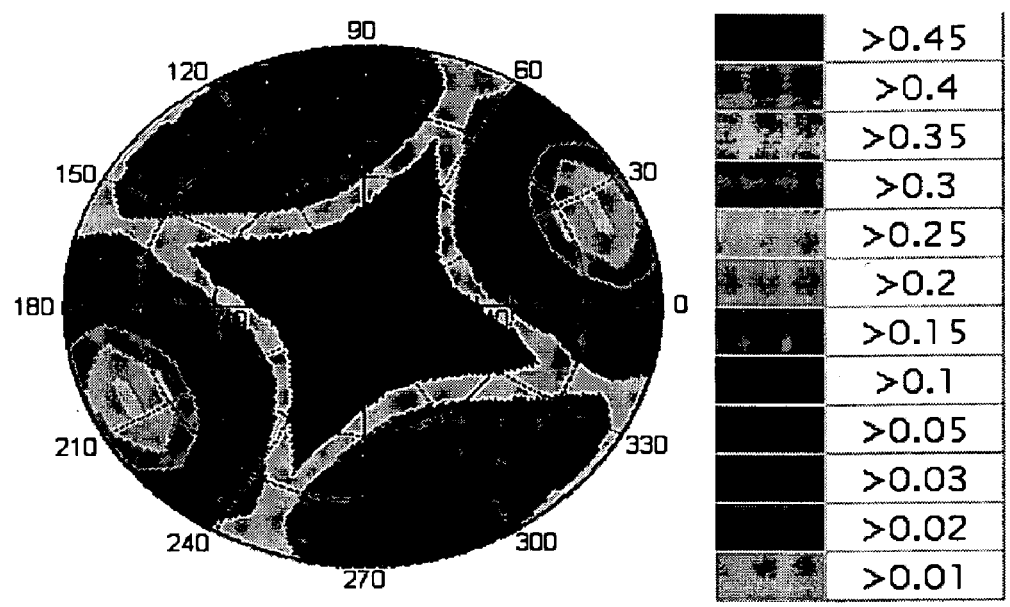
Figure 10:
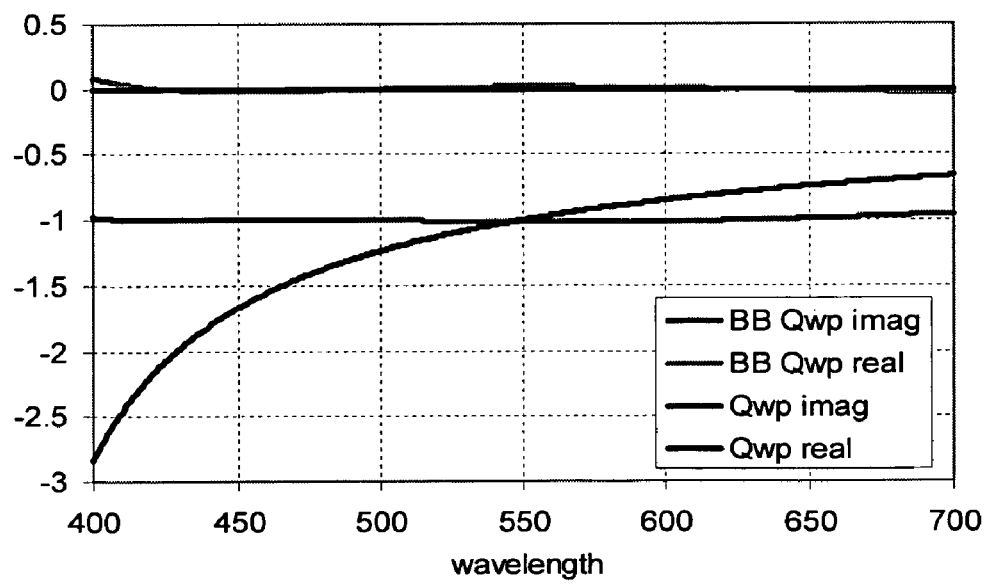
FIG. 10 sets forth real and imaginary parts of the y-component of the output Jones vector of the QWP of the present invention.

The same conventional HWPs and QWPs as given in equation (35) are used again. The specific angles of this design are listed in Table 1. The measured reflectivity comparison between commercial QWP (available from Nitto Denko Company, Tokyo, Japan) and our broadband QWP is shown in FIG. 9. The reflectivity is measured using crossed polarizers+QWP+Mirror setup. Also the QWP changes the input linearly polarized light to output circularly polarized light for the whole visible region. FIG. 10 shows the real and imaginary parts of the y-component of the output Jones vector for the commercial QWP and our broadband QWP on the condition that the x-component of the output Jones vector is normalized and the input is linearly polarized light. It can be seen that the output of the commercial QWP is the elliptically polarized light, and the ellipticity is a function of the wavelength; while the output of our QWP is $$\begin{pmatrix} 1 \\ -i \end{pmatrix} \text{ or } \begin{pmatrix} 1 \\ i \end{pmatrix},$$

independent on the wavelength. It provides circularly polarized light for the whole visible spectrum.

5. Three Layer Design (QWP+QWP+QWP)

In the fifth preferred embodiment of this invention, three conventional QWP are used to make the broadband QWP. The design rules are:

$\phi_1 = 5° \sim 25°$ $\phi_2 = \phi_1 \pm 5°$ $\phi_3 = 2\phi_1 + 45° \pm \Delta\phi$ Another set of design rules are:

$\phi_1 = 20° \sim 30°$ $\phi_2 = \phi_1 \pm 5°$ $\phi_3 = 2\phi_1 + 45° \pm \Delta\phi$ Yet another set of design rules are:

$\phi_1 = 65° \sim 85°$ $\phi_2 = \phi_1 \pm 5°$ $\phi_3 = 2\phi_1 + 45° \pm \Delta\phi$ $\Delta\phi$ ranges ±5° as before.

Here $\phi_3$, $\phi_2$ and $\phi_1$ are the orientation angles of the $3^{rd}$, $2^{nd}$ and $1^{st}$ QWP, respectively.

It should be noted that if $\phi_1, \phi_2, \phi_3 \ldots \phi_n, \phi_p$ are the solutions, then $-\phi_1, -\phi_2, -\phi_3 \ldots -\phi_n, -\phi_p$ are also solutions. (The reversed order is not the solution.)

Here we summarize two sets of specific designs of broadband QWP and HWP in the following two tables. The examples in Table 1 are optimized for the least wavelength dispersion. The examples in Table 2 are optimized for best viewing angles. It can be seen that for the HWP, the best dispersion design also corresponds to the best viewing angle designs. For the QWP, it is not true. For the QWP, the best dispersion and best viewing angles can be achieved simultaneously with biaxial films, as shown in Table 3. Here we make use of commercial films from Nitto-Denko (NRZ films), having $n_z = (n_x - n_z)/(n_x - n_y) = 0.5$ ($n_x > n_z > n_y$).

TABLE 1

Specific examples for broadband HWP and QWP.

| Orientation | $1^{st}$ film | $2^{nd}$ film | $3^{rd}$ film |
|---|---|---|---|
| HWP | 20° (H) | 64° (H) | — |
| HWP | 78° (H) | 49° (H) | 16° (H) |
| QWP | 15° (H) | 75° (Q) | — |
| QWP | 7° (H) | 35° (H) | −79° (Q) |
| QWP | 15° (Q) | 15° (Q) | 75° (Q) |

TABLE 2

Specific examples for broadband HWP and QWP.

| Orientation | $1^{st}$ film | $2^{nd}$ film | $3^{rd}$ film |
|---|---|---|---|
| HWP | 20° (H) | 64° (H) | — |
| HWP | 78° (H) | 49° (H) | 16° (H) |
| QWP | 9.6° (H) | 61.5° (Q) | — |
| QWP | 3.4° (H) | 17.3° (H) | 70.6° (Q) |

TABLE 3

Specific broadband QWP using biaxial film having Nz = 0.5

| Orientation | $1^{st}$ film | $2^{nd}$ film | $3^{rd}$ film |
|---|---|---|---|
| QWP | 15° (H) | 73° (Q) | — |
| QWP | 8° (H) | 39° (H) | −73° (Q) |

The following references, as well as any other patents and patent applications referred to herein, are incorporated by reference:

[1] P. Yeh and C. Gu, *Optics of Liquid Crystal Displays*, Wiley Inter-Science 1999.
[2] W. C. Yip, H. C. Huang and H. S. Kwok, Appl. Opt. 36, 6453 (1997).
[3] M. Robinson, G. Sharp and J. M. Chen, *Polarization Engineering for LCD Projection*, Wiley 2005.
[4] Pancharatnam. S, Proc. Indian Acad. Sci. A41, 130 (1955).
[5] T. Ishinabe, T. Miyashita and T. Uchida, Symposium on Information Display Digest, 906 (2001).
[6] X. J. Yu, Y. B. He, J. Y. Xiong, F. H. Yu, and H. S. Kwok, Displays, 23, 145 (2002).
[7] E. O. Ammann, Journal of the Optical Society of America, 56, 943, (1966).

We claim:

1. A stack of two uniaxial or biaxial retardation plates acting as a single retardation plate with a constant retardation value of π, to within ±5% variation, over the wavelength range of 400-700 nm, wherein each of the individual uniaxial or biaxial retardation plates has a retardation value of π at wavelength λ, where λ is within the range 400-700 nm.

2. A stack of two uniaxial or biaxial retardation plates acting as a single retardation plate with a constant retardation value of π, to within ±5% variation, over the wavelength range of 400-700 nm, wherein each of the individual uniaxial or biaxial retardation plates has a retardation value of π at wavelength λ, where λ is within the range 400-700 nm, having:
   a. a first retardation plate of the stack oriented with its optical axis at an angle of 15-30° relative to the polarization direction of the input light; and
   b. a second retardation plate of the stack oriented with its optical axis at an angle of 55-80° relative to the polarization direction of the input light.

3. A stack of two uniaxial or biaxial retardation plates according to claim 2, having:
   a. a first retardation plate of the stack oriented with its optical axis at an angle of 20° relative to the polarization direction of the input light; and
   b. a second retardation plate of the stack oriented with its optical axis at an angle of 64° relative to the polarization direction of the input light.

4. A stack of two uniaxial or biaxial retardation plates acting as a single retardation plate with a constant retardation value of π/2, to within ±5% variation, over the wavelength range of 400-700 nm, with one of the individual uniaxial or biaxial retardation plates having a retardation value of π at wavelength λ, and the other one of the individual uniaxial or biaxial retardation plates having a retardation value of π/2, at wavelength λ, where λ is within the range 400-700 nm, wherein a first retardation plate of the stack has a retardation value of π at wavelength λ, where λ is within the range 400-700 nm, and is oriented with its optical axis at an angle of 65°-85° relative to the polarization direction of the input light.

5. A stack of two uniaxial or biaxial retardation plates according to claim 4, wherein a second retardation plate of the stack has a retardation value of π/2 at wavelength λ, where λ is within the range 400-700 nm, and is oriented with its optical axis at an angle of −10° to 40° relative to the polarization direction of the input light.

* * * * *